Jan. 1, 1929.  G. SCHWIETZKE  1,697,372
MILLING MACHINE
Filed Nov. 15, 1926    2 Sheets-Sheet 1

Inventor:
G. Schwietzke
By: Marks & Clark
Attys.

Inventor:
G. Schwietzke
By: Marks & Clerk
Attys.

Patented Jan. 1, 1929.

1,697,372

UNITED STATES PATENT OFFICE.

GOTTLIEB SCHWIETZKE, OF DUSSELDORF, GERMANY.

MILLING MACHINE.

Application filed November 15, 1926, Serial No. 148,582, and in Germany April 16, 1926.

The present invention relates to a milling machine for drills, such as are used by dentists, and for similar tools.

Hitherto such drills were milled automatically, but according to the present invention they also are fed automatically from a magazine to the chuck and moreover are automatically clamped in and released from such chuck.

Some constructional forms of a milling machine for dental drills according to the invention are shown by way of examples in the accompanying drawings.

Figure 1:
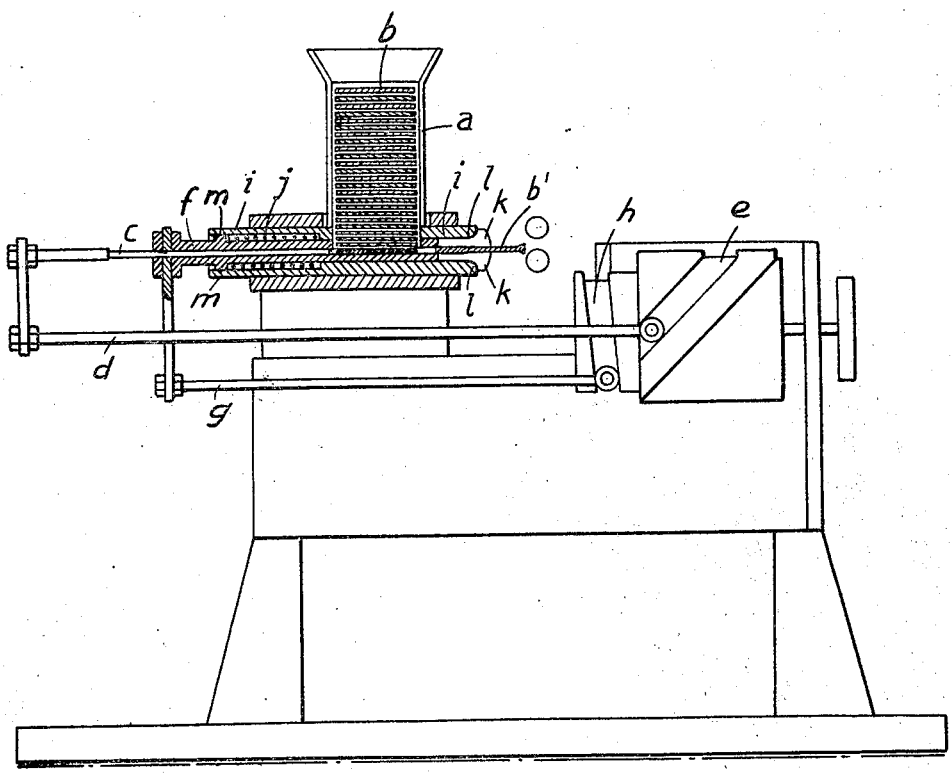
Fig. 1 is a side elevation, partly in section, of a preferred form of the invention.

In Fig. 1 $a$ is a magazine, into which the drills $b$ to be milled are loaded preliminary to grinding. The ejection of the drill which is situated lowermost in the magazine is effected by means of an ejector or push rod $c$, which by means of another rod $d$ is operated from a slotted drum, a guide roller at the end of the rod $d$ engaging the slot or groove $e$ in the said drum. The drill is clamped into the chuck $k$ by means of a tubular spindle or hollow rod $f$ through the central bore of which the push rod $c$ is passed. The chuck $k$ is formed of clamping members at the forward end of the tubular spindle $f$ and these members normally tend to open. The hollow rod $f$ is operated by means of a rod $g$, which at one end is equipped with a roll, which engages a guide slot $h$ in the above mentioned drum. A fixed sleeve $i$ surrounds the hollow rod $f$. This sleeve is provided with a flared mouth, as at 1. The chuck $k$ is formed with an enlarged flared mouth, which will be forced against the part $l$ of the sleeve $i$ when the parts $f$, $k$ under the combined action of the rod $g$ and the spring $j$ are moved backward, whereby the chuck is clamped around the drill $b^1$. When the hollow rod $f$ again is moved forward the chuck opens and releases the said drill. The rod $f$ is formed at one end with an annular shoulder $m$ against which abuts an end of the coiled spring $j$, the other end of the spring abuts a similar shoulder on the interior of the sleeve $i$. The spring under compression normally tends to retract the hollow rod or tubular spindle $f$ within the fixed sleeve $i$.

Figure 2:
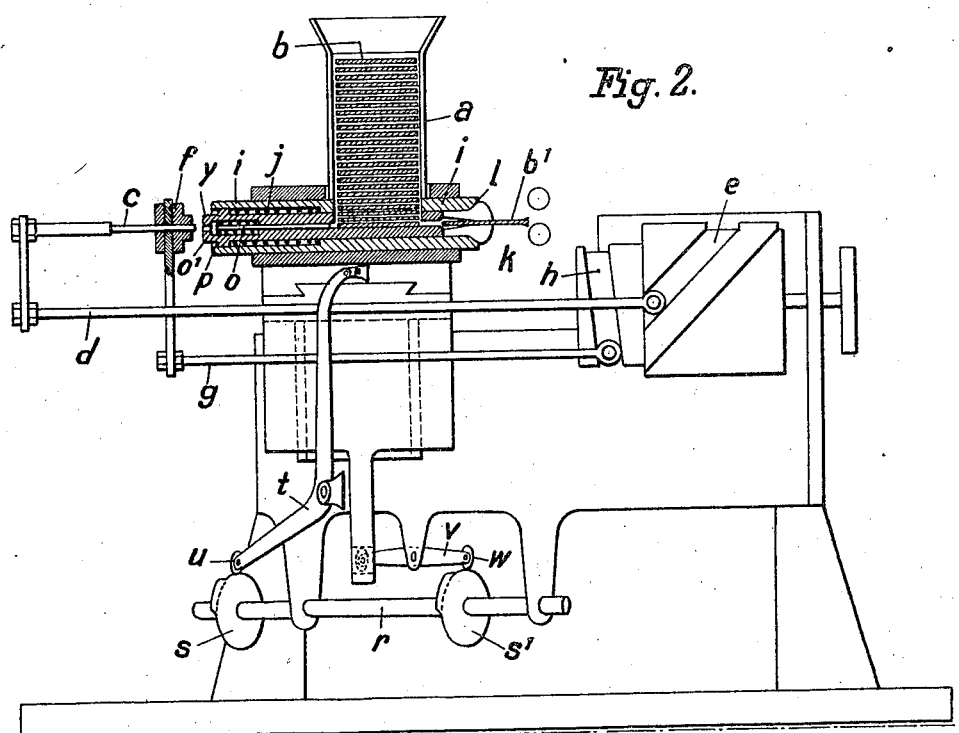
Fig. 2 is a similar view of an other form of the new machine.

According to the form of the invention shown in Fig. 2 the drill $b^1$ to be milled, the magazine $a$ and the chuck $k$ are mounted on a support movable horizontally as well as vertically. The rods for opening the chuck $k$ and for feeding the drill $b^1$ move horizontally of the said chuck. Each rod consists of two pieces, in that one rod consists of the parts $y$ and $f$ and the other of the parts $c$ and $o$. Both rods are operated from the drum by means of the slots $h$ and $e$ in the manner described with reference to Fig. 1. The drill $b^1$, the coacting devices $i$, $k$, $l$ and the magazine $a$ moves during the milling process vertically and horizontally to the axis of the drill. As diagrammatically shown in Fig. 2 this movement is effected by means of the levers $t$, $v$ and the rollers $u$, $w$, which are operated from the cam disks $s$, $s^1$ on the shaft $r$. One of the distinguishing features of this constructional form is, that the reciprocating pushing device $c$, $o$ effects the opening of the chuck $k$ and the feeding of the drill $b^1$.

The part $o$ of the push rod is formed with a collar $o^1$, which serves as an abutment for a spring $p$ located in a hollow space in the rod $y$. When the rod $c$ is moved against the rod $o$ the latter will push the lowermost drill $b$ out of the magazine. During the return movement of the rod $o$ the collar $o^1$ abuts against the end of the hollow space in the rod $y$ whereby this rod is retracted and the drill $b^1$ is released.

In the arrangment shown in Fig. 2 the drill may be moved in directions vertically and horizontally to its axis at any time during the milling process.

Figure 3:
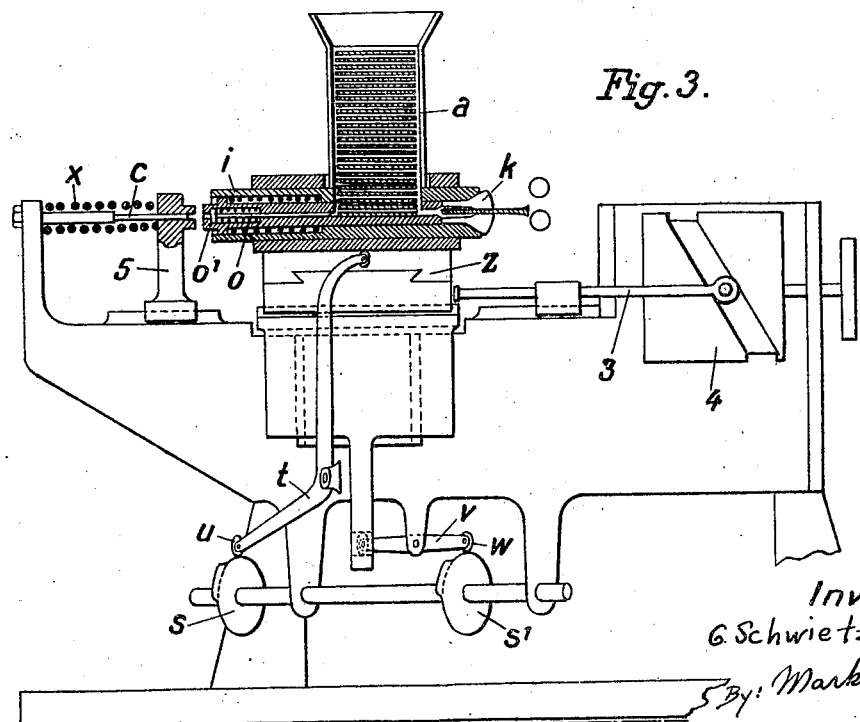
Fig. 3 is also a similar view, partly in section, of a machine which in some details differs from the machine shown in Fig. 2.

The important features of the machine shown in Fig. 3 are, that the push rod $c$ is fixed and that the opening of the chuck $k$ and the feeding of the drills is effected by moving a slide, which carries the drill, the chuck $k$ and the magazine $a$.

The slide $z$ is driven from a slotted drum 4 by means of a rod 3. The front end of the rod $c$ rests in a shiftable upright 5. A spring $x$ rests with one end against the said upright and surrounds the rod $c$.

This device operates in a similar way as the device shown in Fig. 2 the only differences being that such parts as were fixed in Fig. 2 are movable in this apparatus and that the push rods are stationary.

The milling machines hitherto used ordinarily were operated semi-automatically as the feeding of the drills as well as the clamping and releasing of the same were effected manually. Compared with these the new machine possesses the very great advantage that the above mentioned operations and also the milling proper are effected automatically.

I claim:

1. In a machine for milling dental drills and the like, the combination with a support carried by the housing of the machine, of a sleeve fixed on the support and provided at its forward end with a flared mouth, a magazine to receive the drills mounted to discharge the drills into the sleeve, a tubular spindle reciprocative in the fixed sleeve and having a normally open chuck at its forward end adapted to be closed by engagement with the flared mouth of the sleeve on retraction of the spindle, said spindle having an elongated slot adapted to register with the discharge opening of the magazine on retraction of the spindle in the sleeve, an ejector reciprocative in the spindle for moving a drill deposited therein to a forward position to be engaged by the chuck, said spindle closing said discharge opening while said drill is being moved forwardly, and means for reciprocating the spindle and the ejector in timed relation to advance the drills and to actuate the chuck.

2. In a machine for milling dental drills and the like, the combination with a support carried by the housing of the machine, of a sleeve fixed on the support and provided at its forward end with a flared mouth, a magazine to receive the drills mounted to discharge the drills into the sleeve, a tubular spindle reciprocative in the sleeve and having at its forward end a normally open chuck adapted to be closed by engagement with the flared mouth of the sleeve on retraction of the spindle, said spindle having at an intermediate part a longitudinal slot in its wall adapted to register with the discharge opening of the magazine on retraction of the spindle in the sleeve, a coiled spring interposed between abutments on the sleeve and spindle respectively normally tending to retract the spindle, an ejector reciprocative in the spindle for moving a drill deposited therein to a forward position to be engaged by the chuck, said spindle closing said discharge opening while said drill is being moved forwardly, and means for reciprocating the spindle and the ejector in timed relation to advance the drills and to actuate the chuck.

In testimony whereof I have signed my name to this specification.

GOTTLIEB SCHWIETZKE.